Dec. 6, 1949 H. NEUWIRTH 2,490,370
MEANS FOR TRANSMITTING AND RADIATING LIGHT
RAYS EMITTED FROM A SOURCE OF LIGHT
Filed Sept. 12, 1946 2 Sheets-Sheet 1
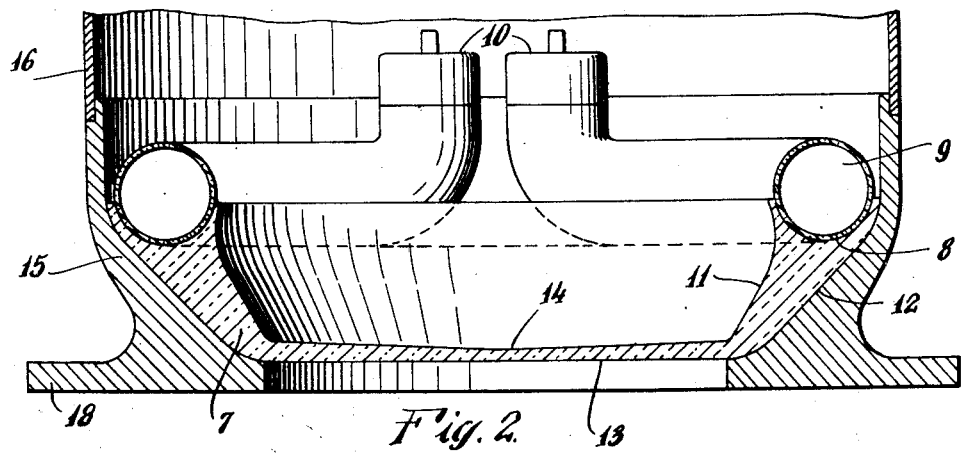
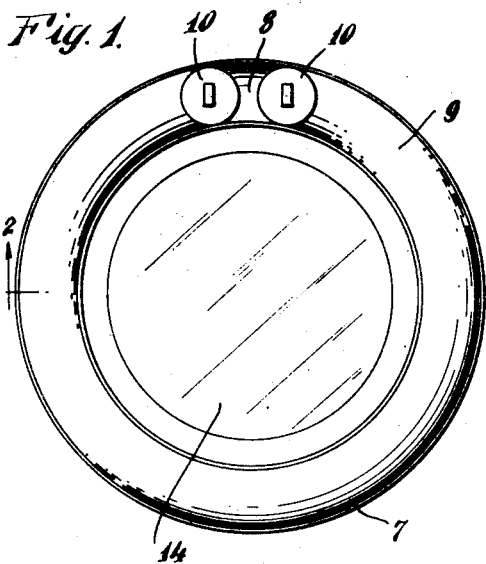
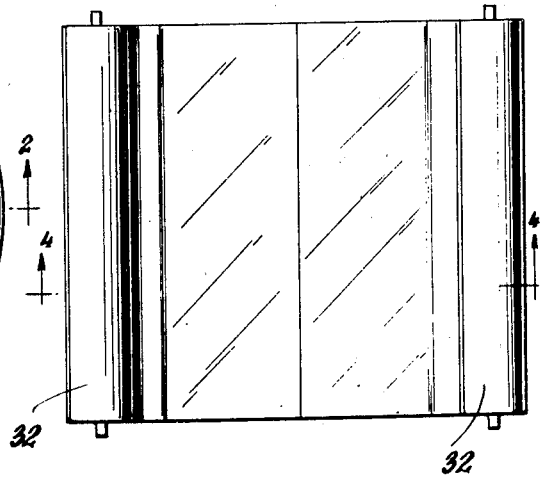
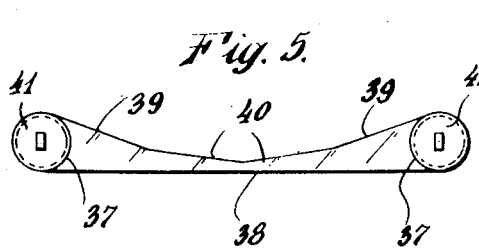
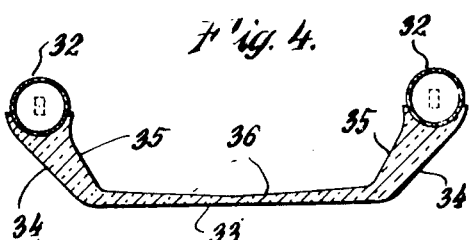
INVENTOR.
H. Neuwirth
BY John O. Seifert
ATTORNEY.

Dec. 6, 1949   H. NEUWIRTH   2,490,370
MEANS FOR TRANSMITTING AND RADIATING LIGHT
RAYS EMITTED FROM A SOURCE OF LIGHT
Filed Sept. 12, 1946   2 Sheets-Sheet 2
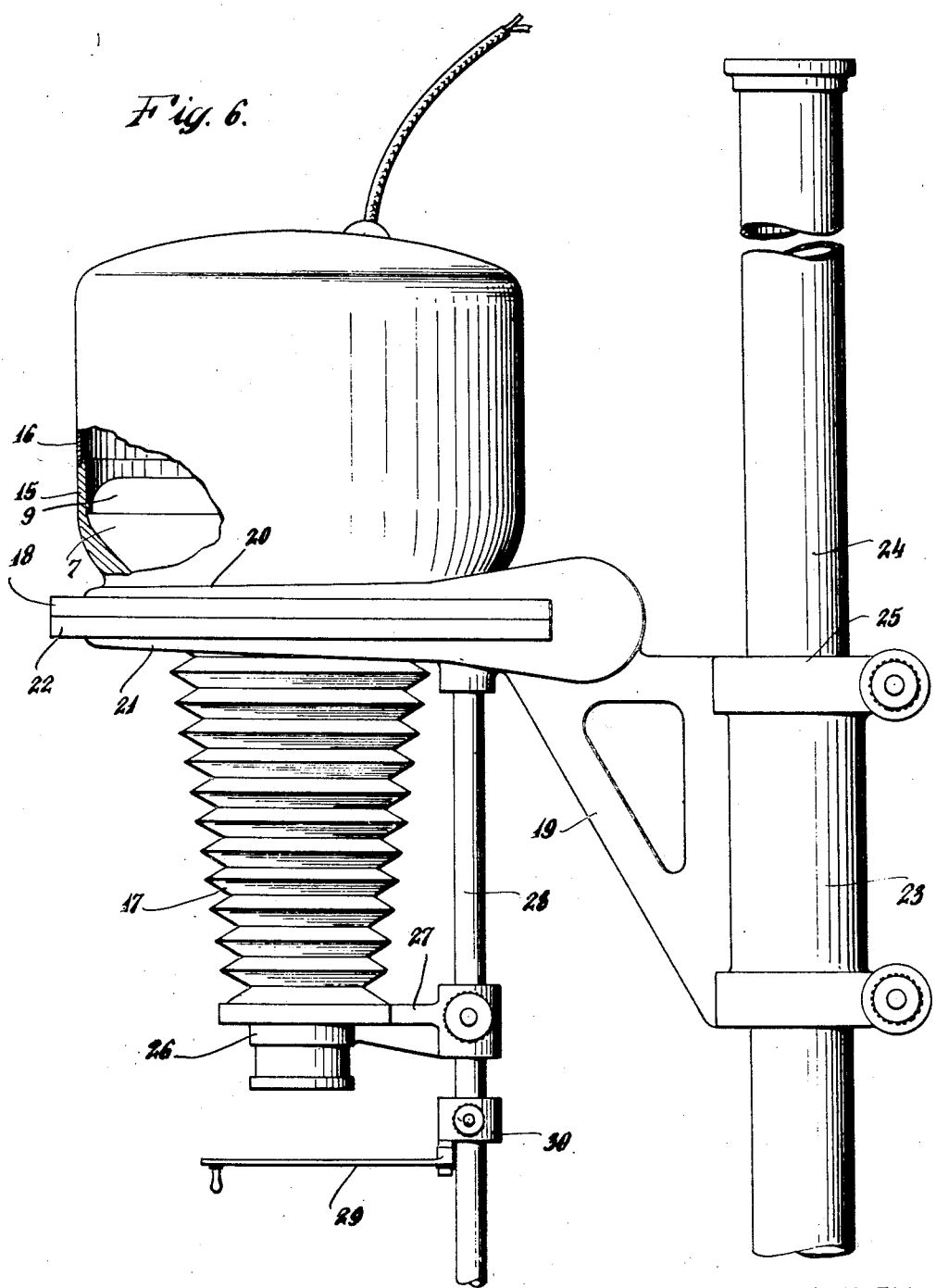
INVENTOR.
H. Neuwirth
BY John O. Seifert
ATTORNEY.

Patented Dec. 6, 1949

2,490,370

UNITED STATES PATENT OFFICE 2,490,370

MEANS FOR TRANSMITTING AND RADIATING LIGHT RAYS EMITTED FROM A SOURCE OF LIGHT

Herman Neuwirth, Brooklyn, N. Y., assignor to The Testrite Instrument Co. Inc., New York, N. Y., a corporation of New York Application September 12, 1946, Serial No. 696,580

1 Claim. (Cl. 88—24)

This invention relates to means for transmitting light rays emitted from a source of light through and the radiating of the light rays from a surface of said means in uniformly distributed light rays of substantially constant light intensity at a place remote from the source of light.

It is the object of the invention to provide a body of transparent material having opposite smooth and/or flat surfaces to aid in the transmission of light rays longitudinally thereof, and adapted for the transmission of light rays therethrough emitted from a source of light, particularly cold light, in a straight course edgewise into and through the body of material and arranged to reflect and change the direction of the rays of light to pass obliquely through and be radiated from a surface of the body of material in uniformly distributed light rays of substantially constant light intensity.

The body of the material is in the form of a circular or rectangular plate, and comprises transparent material having the property of permitting the transmission of light rays edgewise therethrough without transmitting the light rays from the surface of the plate. Plastic compounds having optical properties, such as methyl methacrylate and polystyrene, have been found suitable for the purpose. The surfaces of said materials are arranged to permit the transmission of light rays longitudinally thereof and prevent radiating of light rays therefrom by polishing the surfaces. Light rays emitted from a source of light, as an electric or fluorescent lamp, disposed at one or opposite edges of the body or plate of material will be transmitted edgewise through the body or plate without transmitting said light rays through the side surfaces thereof. The light rays transmitted through the body or plate of the material are reflected and change their straight course to pass obliquely through and be radiated from a side surface, or from a portion thereof, for which purpose the polish of said surface, or a portion thereof, is destroyed, as by sand blasting or otherwise, the sand blasting not only removing the material constituting the polished surface but in effect arranging the sand blasted surface as a prismatic surface or surfaces. By this arrangement the light rays transmitted edgewise through the body of material as they reach said roughened portion of the surface of the material are reflected laterally through said roughened portion of the surface of the material and radiated therefrom in uniformly distributed rays of substantially constant intensity.

The light radiated from the roughened surface of the material may be utilized as a light source for various purposes. One use for which it is adapted is as a light source for photograph enlargers, particularly so when the light rays transmitted edgewise through the material comprise a cold light, such as a fluorescent lamp or lamps, since there will be no generation of heat which may blister, burn or cause a negative to buckle. Furthermore, by the uniform distribution of the light rays of substantially constant intensity of the radiated light there is an increase in the power of the radiant energy of the radiated light and in the action thereof to produce chemical changes in the film of sensitized material applied to material, as photographic paper, when the light is used in apparatus for enlarging photographs and a consequent increase in the output of the apparatus.

In the drawings accompanying and forming a part of this application there is shown means through which light rays emitted from a source of light are transmitted through and radiated from a surface thereof in uniformly distributed rays of substantially constant light intensity, wherein Figure 1 is a top view of a circular body or plate of material through which light rays may be transmitted edgewise and showing a circular light bulb as the source of light associated therewith.

Figure 2 is a sectional view on an enlarged scale taken substantially on the line 2—2 of Figure 1 and showing the manner of mounting the light bulb or source of light in relation to the body or plate of material to transmit the light rays emitted therefrom edgewise through the plate as well as the manner of supporting the same in a support for an enclosing hood therefor, only a part of which hood is shown, of a picture enlarging apparatus.

Figure 3 is a top view of a rectangular plate or body and shows the manner of supporting a light bulb in relation thereto to transmit the light rays emitted therefrom edgewise through and radiate the light rays from a face of the plate.

Figure 4 is a cross sectional view taken on the line 4—4 of Figure 3.

Figure 5 is an end elevation of a modified structure of the body or plate of material and showing the manner of mounting a light bulb or bulbs in relation thereto to transmit the light rays emitted therefrom edgewise through said plate; and Figure 6 is a side elevation of a portion of a photograph or picture enlarger, partly broken away, and showing the relation of the light transmitting and radiating means relative to a lens carrying bellows.

In the embodiment of the invention shown in Figures 1 and 2 of the drawings the body of the material through which the light rays emitted from a source of light are transmitted consists of a plate of transparent material the surfaces of which are polished to enhance the transmission of light rays longitudinally therethrough and prevent the transmitting of light rays laterally from said surfaces. Among the materials adapted for the purpose, as stated, are plastics formed from methyl methacrylate and polystyrene. As shown in Figures 1 and 2 the material is in the form of a circular plate 7 arranged in dish form by arranging the marginal or rim portion to diverge outwardly and the plate is of progressively decreasing thickness from the periphery to the center of the plate. The peripheral edge has a recess 8 therein of arcuate form in cross section adapted for the seating and supporting therein of a fluorescent light bulb 9 to provide a source of cold light. The terminal portions of which bulb are bent to extend outwardly and arranged with electric contacts as at 10, although they may be bent to extend inwardly of the circle formed by the bulb. The surfaces 11, 12 of the rim portion of the plate converge from the recessed edge to the juncture thereof with the portion of the plate within the rim. The outer surface 13 of the plate within the rim or the bottom surface extends in a plane substantially parallel to the recessed portion 8, and the inner face 14 within the rim inclines from the juncture thereof with the inner surface 11 of the rim to the center of the plate and thus arranges the bottom wall of the plate in progressively decreasing thickness inwardly from the rim.

To transmit the light rays emitted from the source of light 9 through the surface of the recess or edge of the plate and edgewise into and in a straight course through the plate and radiate the light rays from the surface 13, the surface of the recess 8 is roughened, and the surface 13 of the plate, or a circular portion thereof of an area substantially equal to that of the inner surface 14 within the surface 11 of the converging wall of the plate is also roughened by sand blasting the same.

The light rays emitted from the light 9 are transmitted through the surface of the recess into and edgewise through the material of the plate and as they pass relative to the roughened portion of the surface 13 they are permitted to pass obliquely toward and through the roughened portion of the face 13 and radiated therefrom in uniformly distributed light rays of substantially constant light intensity.

As stated, a use for the light rays radiated from the face 13 of the plate is as a source of light in photograph or picture enlargers, and it may be used with any form of enlarger including a support 15 for the plate 7 with the portion of the roughened surface 13 exposed, and said support also serving as a support for a hood 16 enclosing the side of the plate 7 at which the light 9 is mounted and electric connections thereof with electric current conductors leading into the hood from a source of electricity. The support is also adapted for the connection thereto and support of a lens carrying bellows 17 with the roughened portion of the surface 13 exposed to said bellows.

As shown in Figure 6 the supporting member 15 for the light rays transmitting and radiating member or plate 7 with the light 9 and supporting the enclosing housing 16 is of annular form, the opening in which is in register with and of substantially the same as or slightly larger diameter than the roughened portion of the surface 13 of the light rays radiating member 7, whereby the light rays radiated from said surface are projected through said opening. The supporting member 15 has an outwardly extending flange 18 whereby it is mounted in a bracket 19 by engaging the flange 18 in the space between a pair of bifurcated arms 20, 21 of the bracket and in juxtaposed relation to the bifurcation legs of the arm 20 and may be releasably secured thereto by suitable means. As usual in photographic enlargers the lens carrying bellows 17, which in the present illustration is of circular form, is carried by an annular support whereby it is connected to the hood carrying member 15. In the present instance said bellows support comprises an annular member having a laterally extending flange, as at 22, adapted to be engaged in the space between bifurcated bracket arms 20, 21 in juxtaposed relation to the bifurcated legs of the arm 21 and may be secured thereto by suitable means with the face of the flange contiguous to and in light tight connection or engagement with the face of the flange 18 of the support 15 for the light rays transmitting and radiating member 7 and the hood 16. The bracket 19 is arranged with a sleeve 23 whereby it is mounted to have sliding adjustment on a pillar or post 24 and the sleeve having split collar portions 25 at the opposite ends adapted to releasably clamp the bracket in adjusted position on the pillar. The pillar extends upwardly from a base member (not shown) as is usual and arranged as a support for the picture or photograph to be enlarged. The bellows, as stated, is of circular form, and to expand and contract the bellows to position the lens 26 carried by the bellows toward and away from the light ray transmitting and radiating member 7, the lens carrier and end of the bellows to which the lens carrier is connected are supported by a bracket 27 slidably mounted on a rod 28 fixed in and extending downwardly from the bracket 19. A negative support 29 is pivotally connected to and extends laterally from a bracket 30 to be positioned in opposed and spaced relation to the lens, the bracket 30 being mounted on an extending portion of the rod 28 to have sliding adjustment thereon to position the negative carrier toward and away from the lens.

The light ray transmitting and radiating member shown in Figures 3 and 4 is of rectangular form with the opposite longitudinal marginal portions diverging from the body of the plate and the edge of said diverging portions having arranged therein a longitudinal recess of arcuate form in cross section and adapted for the engagement of a tubular electric or fluorescent lamp bulb 32, each bulb having the usual electric contact terminals at the ends. The one face 33 of the plate extends in a straight plane and has a central portion thereof roughened, as by sand blasting. The one face 34 of the divering portions extends from one side of the arcuate recess at an obtuse angle to the body of the plate and merges with the face 33. The other face 35 of the diverging portions of the plate inclines from the opposite side of the recess in a direction toward the surface 34 and merges with a portion 36 inclining toward the center of the plate at an acute angle to the surface 33, and thus arranging the plate in progressively decreasing thickness from the recessed edge toward the center of the plate. The light rays emitted from the source of light 32 are transmitted edgewise through the plate and radiated from the roughened portion of the surface 31 in a manner as set forth in connection with the arrangement of the plate 7 in Figures 1 and 2, the surfaces 34, 35 and 36 being polished to enhance the transmission of light edgewise through the plate.

The modified structure of the light radiating member shown in Figure 5 consists of a plate of rectangular form having lamp bulb engaging recesses 37 of arcuate form in cross section in the opposite longitudinal edges of the plate. The one face 38 of the plate extends tangential to one side of the arcuate recesses and has a central circular portion thereof roughened, as by sand blasting. The opposite surface of the plate has portions inclining inwardly at an acute angle to the opposite surface of the plate from the opposite side of the recesses, as at 39, which merge with inclined portions 40 extending at a lesser angle than the portions 39 toward the center of the plate. Electric light bulbs, such as fluorescent light bulbs 41, are seated in the recesses 37 and the light rays emitted therefrom are transmitted edgewise through the plate and the light rays reflected to pass obliquely through and radiated from the roughened portion of the surface 38 in uniformly distributed light of substantially constant intensity, the inclined surfaces 39, 40 also functioning to reflect the light rays laterally, and this is also the case in the arrangement of the inclined portions of the one surface of the light ray transmitting and radiating members in Figures 1, 2 and 3, 4, the inclined surfaces causing the light rays to converge toward each other from the arcuate recesses toward the center of said members or plates.

To prevent the emission of light rays from the light bulbs other than through the portions engaging or seated in the arcuate recesses in the edges of the light ray transmitting and radiating members, the portions of the light bulbs not engaging in said recesses may be rendered opaque by applying a coating of a suitable material thereto.

Having described my invention, I claim:

In means for transmitting light rays emitted from a source of light and radiate the light rays in uniformly distributed light rays of constant light intensity, a pair of tubular fluorescent light bulbs, a plate of light transmitting material the surfaces of which are polished and having recesses of arcuate form in cross section in opposite edges the polished surface of which is roughened, one face of the plate extending in a flat plane tangential to one side of the recesses and having a central portion of the polished surface roughened and the opposite face having portions extending tangential to the opposite side of the recess and inclining at an acute angle relative to the first face of the plate and merging with portions inclining at a lesser angle to the center of the plate, the light bulbs being seated in the arcuate recesses in contact with the roughened surface thereof and the rays emitted therefrom transmitted edgewise through the plate and reflected through the roughened surface portion of the flat face of the plate.

HERMAN NEUWIRTH.

REFERENCES CITED

The following references are of record in the file of this patent:

UNITED STATES PATENTS

| Number | Name | Date |
| --- | --- | --- |
| 1,760,253 | Parrish | May 27, 1930 |
| 1,880,414 | Capstaff | Oct. 4, 1932 |
| 1,935,729 | Rosenbaum | Nov. 21, 1933 |
| 2,001,378 | Cornwall | May 14, 1935 |
| 2,124,089 | Stuerzl | July 19, 1938 |
| 2,186,143 | Neugass | Jan. 9, 1940 |
| 2,216,993 | Von Wedel | Oct. 8, 1940 |
| 2,404,627 | Goldberg | July 23, 1946 |